US010775632B1

(12) United States Patent
Chapalamadugu et al.

(10) Patent No.: US 10,775,632 B1
(45) Date of Patent: Sep. 15, 2020

(54) AUGMENTED REALITY LIGHT SECURITY SHUTTER

(71) Applicant: Rockwell Collins, Inc., Cedar Rapids, IA (US)

(72) Inventors: Siva K. Chapalamadugu, San Diego, CA (US); Wyatt L. Hendrick, Encinitas, CA (US); Tyrone O'Brien, Carlsbad, CA (US); Robert Civilikas, Carlsbad, CA (US); Luca Rigolin, Aliso Viejo, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/668,756

(22) Filed: Oct. 30, 2019

(51) Int. Cl.
*G02B 27/01* (2006.01)
*G02B 6/42* (2006.01)
*F21V 9/08* (2018.01)

(52) U.S. Cl.
CPC ............ *G02B 27/0176* (2013.01); *F21V 9/08* (2013.01); *G02B 6/4203* (2013.01); *G02B 2027/013* (2013.01); *G02B 2027/0174* (2013.01)

(58) Field of Classification Search
CPC .............. G02B 27/0176; G02B 6/4203; G02B 2027/013; G02B 2027/0174; F21V 9/08
See application file for complete search history.

(56) References Cited

U.S. PATENT DOCUMENTS

| | | |
|---|---|---|
| RE36,792 E | 7/2000 | Sonchara |
| 6,288,700 B1 | 9/2001 | Mori |
| 8,451,401 B2 | 5/2013 | Kawana et al. |
| 9,019,448 B2 | 4/2015 | Han et al. |
| 9,039,266 B2 | 5/2015 | Gibson |
| 9,651,786 B1 * | 5/2017 | Browne .............. G09G 3/02 |
| 2012/0140513 A1 | 6/2012 | Shibata et al. |
| 2012/0292488 A1 * | 11/2012 | Saadat ............... G02F 1/13306 250/214 AL |
| 2014/0125785 A1 * | 5/2014 | Na .................... G02B 27/017 348/56 |
| 2015/0309316 A1 * | 10/2015 | Osterhout ........... G06F 3/0346 345/8 |

(Continued)

FOREIGN PATENT DOCUMENTS

AU  2002259175 A1  11/2002

*Primary Examiner* — Temesghen Ghebretinsae
*Assistant Examiner* — Ivelisse Martinez Quiles
(74) *Attorney, Agent, or Firm* — Suiter Swantz pc llo

(57) ABSTRACT

A system and method for augmented reality (AR) visor light security employs an optical shutter to mitigate illumination escaping from a see-through waveguide holographic AR display incorporated with a ballistic visor. Based on a security level of the environment, the user selects an auto or manual mode to command a full transmittance, partial transmittance, or full occlusion automatically set via ambient sensors within the system to remove glare and better view a contrast of AR images presented on the waveguide. In high security, the user relies solely on enhanced vision systems display on the waveguide for situational awareness and desire a full bi-directional occlusion of the optical shutter allowing zero emissions from the visor. An optical shutter sensor continuously measures the current level of occlusion to ensure it matches a commanded occlusion and if not, the system disables the display source and removes the occlusion.

15 Claims, 6 Drawing Sheets

(56) References Cited

U.S. PATENT DOCUMENTS

| | | |
|---|---|---|
| 2016/0041317 A1 | 2/2016 | Kim et al. |
| 2018/0084245 A1 | 3/2018 | Lapstun |
| 2018/0180882 A1* | 6/2018 | Tuli ...................... G06T 19/006 |
| 2018/0180883 A1* | 6/2018 | Tuli ................... G02B 27/0172 |
| 2018/0188538 A1* | 7/2018 | Bell ..................... G02B 27/017 |
| 2020/0111259 A1* | 4/2020 | Sears ...................... G06F 3/012 |

* cited by examiner

AUGMENTED REALITY LIGHT SECURITY SHUTTER

BACKGROUND

Holographic waveguides may emit a significant amount of light from each of a front and rear surface. This light emission may limit its use in night operation and when security is critical, especially in scenarios where a user's light signature may be detectable by hostile forces.

Traditional occluded (non see-through) displays may attempt to block light emissions using physical barriers between the display and external areas. Traditional mitigation techniques may include placing an eye cup around a user (eye to display) area to mitigate display light emissions as well as face reflection light emanating from the facial area.

During bright daylight operations, a see-through augmented reality (AR) holographic waveguide may allow excessive ambient light transmission through the waveguide limiting a user's ability to view a contrast of the information displayed on the waveguide. Some optical shutters may offer a diming feature of an ambient component to enhance holographic visibility but do not provide an adequate light security ability to occlude the shutter to zero transmittance ensuring light security.

Ballistic eye and face protection may be a requirement for many helmet devices in use by some operators (e.g., military forces). While holographic waveguides may be incorporated within the facial areas of the helmet device, any light emission from the facial area may cause concern.

Therefore, a need remains for a system and related method which may overcome these limitations and provide a novel solution to mitigation of light emission from a ballistic AR visor ensuring light security for the user.

SUMMARY

In one aspect, embodiments of the inventive concepts disclosed herein are directed to a system for augmented reality visor light security. The system may comprise an optical shutter associated with and enclosing a visor, the optical shutter configured for a full transmittance, a partial transmittance, and a full occlusion of an illumination through the visor, the visor configured for a ballistic protection of a user.

To ensure accurate operation, the system may include an optical shutter sensor operatively coupled with the optical shutter and configured for measuring 1) a controlled transmittance and 2) an ambient component transmittance. To manipulate the optical shutter, a switching circuit may be configured for receiving a transmittance command and electrically commanding an optical shutter transmittance, the optical shutter transmittance including the full transmittance, the partial transmittance, and the full occlusion.

To display information to the user, a see-through waveguide may be associated with the visor and a display source may be configured to present an image to the user via an illumination of the see-through waveguide.

For system control, a controller may operatively couple with the display source, the switching circuit, and the optical shutter sensor and a tangible, non-transitory memory configured to communicate with the controller, the tangible, non-transitory memory having instructions stored therein that, in response to execution by the controller, cause the controller to carry out the steps of the system.

The system function may include causing the controller to receive a security input from the user including a secure environment and a nonsecure environment and receive the measured controlled transmittance and the measured ambient component transmittance from the optical shutter sensor.

Should the user command a nonsecure environment, the controller may command the optical shutter transmittance to the full transmittance of the illumination and command the display source to illuminate the see-through waveguide. If in a secure environment, the controller may command the optical shutter transmittance to the partial transmittance and the full occlusion of the illumination based on the measured ambient component transmittance. To confirm, the controller may receive the measured controlled transmittance from the optical shutter sensor and compare the received measured controlled transmittance with the commanded optical shutter transmittance. If equal, the controller may command the display source to illuminate the see-through waveguide. However, if unequal, the controller may command the display source and the optical shutter to off.

A further embodiment of the inventive concepts disclosed herein may include a method for augmented reality visor light security. The method may comprise enclosing a visor with an optical shutter, the optical shutter configured for a full transmittance, a partial transmittance, and a full occlusion of an illumination through the optical shutter and associating the visor with a see-through waveguide with an associated display source.

The method may include sensing an optical shutter transmittance via an optical shutter sensor as one of an ambient component transmittance and a controlled transmittance of the illumination through the optical shutter and measuring the controlled transmittance through the optical shutter as the full transmittance, the partial transmittance, and the full occlusion based on the sensing.

The method may include receiving a security input from a user including one of: a secure environment and a nonsecure environment and, if the security input is the nonsecure environment, the method may include commanding the optical shutter transmittance to the full transmittance and commanding the display source to illuminate the see-through waveguide.

However, if the security input is the secure environment, the method may include commanding the optical shutter transmittance to the partial transmittance and/or the full occlusion based on the sensed ambient component transmittance. The method may include receiving the measured controlled transmittance from the optical shutter sensor and comparing the measured controlled transmittance with the commanded optical shutter transmittance.

if the measured optical shutter transmittance equals the commanded optical shutter transmittance, the method may include commanding the display source to illuminate the see-through waveguide. However, if the measured optical shutter transmittance does not equal the commanded optical shutter transmittance, the method may include commanding the display source to off and the optical shutter to off.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
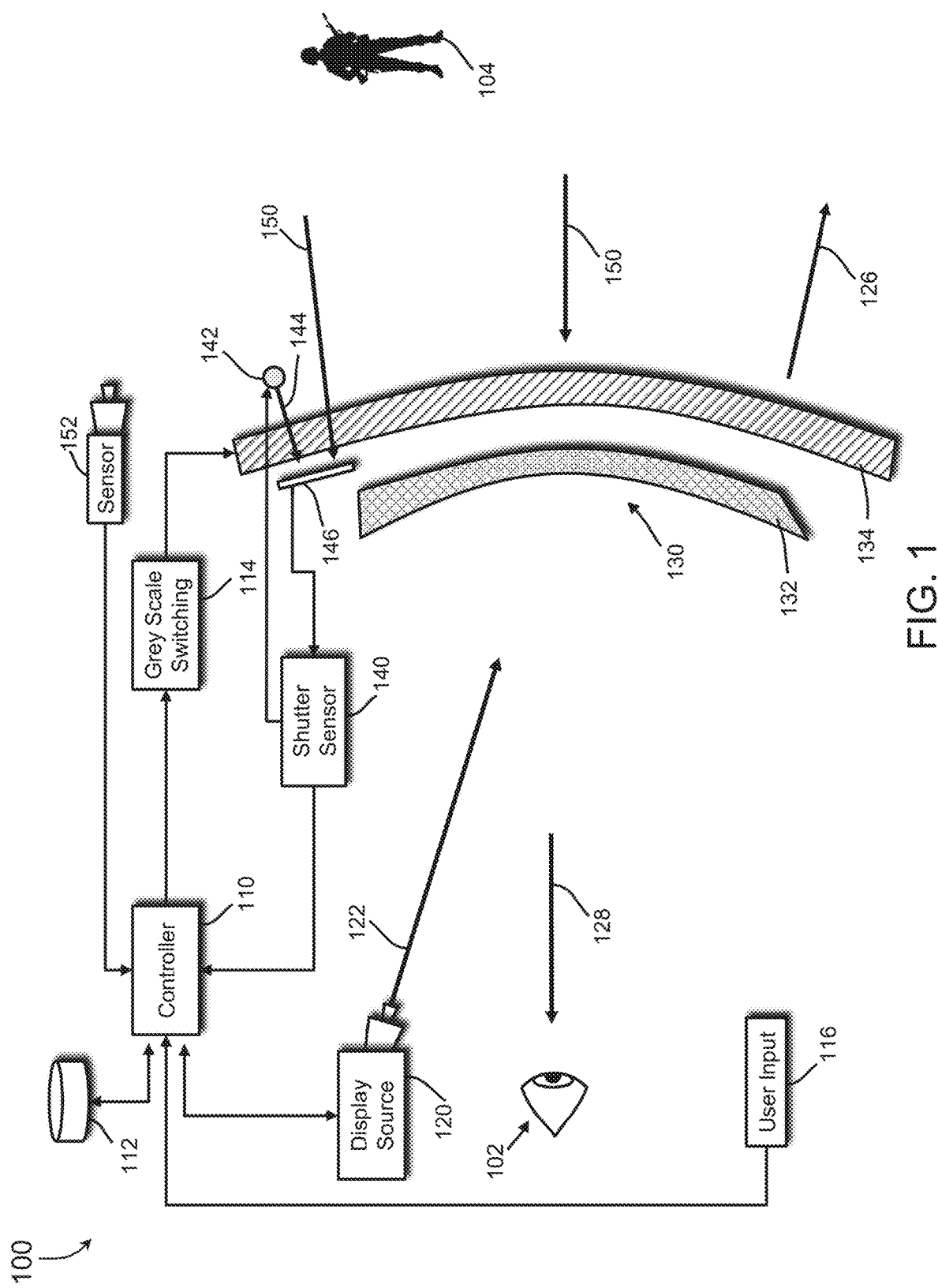
FIG. 1 is a diagram of a system for light security in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and related method for augmented reality (AR) visor light security. The system employs an optical shutter to mitigate escaping illumination from a see-through waveguide holographic AR display incorporated with a ballistic visor. The optical shutter completely encloses the ballistic visor offering a full occlusion of the waveguide illumination internal to the user visor. Based on a security level of the environment, the user desires a full or partial transmittance automatically set via ambient sensors within the system to remove glare and better view a contrast of AR images presented on the waveguide. In high security, the user relies solely on enhanced vision systems display on the waveguide for situational awareness and desire a full bi-directional occlusion of the optical shutter allowing zero emissions from the visor. An optical shutter sensor continuously measures the current level of occlusion to ensure it matches a commanded occlusion and if not, the system disables the display source and removes the occlusion

| REFERENCE CHART | |
|---|---|
| 100 | System Diagram |
| 102 | User Eye |
| 104 | Enemy Soldier |
| 110 | Controller |
| 112 | Memory |
| 114 | Grey Scale Switching Circuit |
| 116 | User Input |
| 120 | Display Source |
| 122 | Display Illumination |
| 126 | Display Light Transmittance |
| 128 | Light to User Eye |
| 130 | Ballistic Visor |
| 132 | See Through Waveguide |
| 134 | Optical Shutter |
| 140 | Optical Shutter Sensor |
| 142 | Sensor Light Emitting Diode (LED) |
| 144 | Controlled Transmittance |
| 146 | Sensor Receiver |
| 150 | Ambient Component |

-continued

REFERENCE CHART

| | |
|---|---|
| 152 | Enhanced Vision Sensor |
| 200 | Ballistic Visor Detail |
| 202 | Separate Surfaces |
| 204 | Joined Surfaces |
| 232 | Air Gap |
| 234 | Clear Adhesive |
| 236 | Ballistic Layer |
| 300 | Helmet Side View Clear |
| 302 | Helmet |
| 330 | Nonsecure Transmittance |
| 400 | Helmet Side View Active |
| 430 | Secure Transmittance |
| 500 | Logic Flow |
| 502 | Select Mode |
| 504 | Secure Ops? |
| 506 | Set Nonsecure Transmittance |
| 508 | Display On |
| 510 | Shutter Active |
| 512 | Set Secure Transmittance |
| 514 | Display Off |
| 600 | Method Flow |
| 602 | Enclosing a visor |
| 604 | Associating a waveguide |
| 606 | Sensing optical shutter |
| 608 | Measuring transmittance |
| 610 | Receiving user input |
| 612 | Commanding full transmittance |
| 614 | Commanding display on |
| 616 | Commanding partial transmittance/full occlusion |
| 618 | Receiving controlled measurement |
| 620 | Comparing measured with commanded |
| 622 | Display on if equal |
| 624 | Display off if unequal |
| 626 | Optical Shutter off if unequal |

FIG. 1 System

Referring now to FIG. 1, a diagram of a system for light security in accordance with an embodiment of the inventive concepts disclosed herein is shown. Generally, the system for augmented reality (AR) visor light security 100 may offer an integrated light security solution combined with ballistic protection of a user. The system for AR visor light security 100 may include a ballistic visor 130 comprised of an optical shutter 134 proximal with a see-through waveguide 132. The optical shutter 134 may be associated with and enclosing the visor 130 where the optical shutter 134 may be specifically configured to allow a full transmittance of an illumination through the visor 130, and also prevent transmittance of the illumination via a partial transmittance, and a full occlusion. The visor 130 may be specifically configured for ballistic protection of a user.

In one embodiment of the inventive concepts disclosed herein, the ballistic visor 130 may include an additional layer of material for a desired ballistic protection while in some embodiments, the optical shutter 134 coupled or proximal with the see-through waveguide 132 may be constructed of material sufficient to provide the desired ballistic protection.

The system for AR visor light security 100 may further include a controller 110 operatively coupled with a memory 112, a grey scale switching circuit 114, a user input 116, and a display source 120 configured to produce a display illumination 122. The controller 110 may also operatively couple with an optical shutter sensor 140 configured for measuring 1) the controlled transmittance 144 through the optical shutter 134, and 2) the ambient component 150 transmittance through the optical shutter 134. The optical shutter sensor 140 may also include a sensor LED 142 capable of producing the controlled transmittance 144 through the optical shutter 134 to a sensor receiver 146. Here, the controlled transmittance may be measured via the transmittance from the sensor LED 142 sited on a first side of the optical shutter 134 measured by the sensor receiver 146 sited on an opposite second side of the optical shutter 134.

As light may pass throughout the system for AR visor light security 100, the display source 120 may produce the display illumination 122 functional to produce a holographic AR image via the see-through waveguide 132 viewable by a user eye 102 as light to user eye 128 but also, in some situations, able to pass through the visor 130 to become display light transmittance 126 also viewable by an enemy soldier 104. In an opposite direction, an ambient component 150 may pass through the visor 130 available to the user eye 102 as well as being captured by an enhanced vision sensor 152 routed through the controller 110 and display source 120 to the see-through waveguide 132 as an AR image available to the user eye 102. Here, a source of the illumination may include the display source 120, a reflection of the display illumination 122 provided by the display source 120, and the ambient component 150.

For example, all illumination from within the visor 130 (e.g., between the user eye 102 and the visor 130 may, without the optical shutter 134, escape from the visor 130 as display light transmittance 126 detectable by the enemy soldier 104. With embodiments of the ballistic visor 130 disclosed herein, the illumination within the visor 130 may be captured within the visor 130 allowing zero emissions outside the visor 130.

The grey scale switching circuit 114 may be configured for receiving a transmittance command from the controller 110 and electrically commanding an optical shutter transmittance for an amount of illumination (light) which may pass through the optical shutter 134. The optical shutter transmittance may include the full transmittance, the partial transmittance, and the full occlusion of illumination through the optical shutter 134.

In one embodiment of the inventive concepts disclosed herein, the grey scale switching circuit 114 may command the optical shutter 134 to the full transmittance equaling a 0% (zero) occlusion (e.g., clear), to the partial transmittance equaling an occlusion range from 1% (one) to 99% (ninety-nine), and the full occlusion equaling a 100% (one hundred) occlusion of the illumination.

The see-through waveguide 132 associated with the visor 130 may function as a see-through AR display to present a holographic image available to the user eye 102 via the display illumination 122 from the display source 120. As light may strike the see-through waveguide 132, it may also pass through the see-through waveguide 132 to places external to the visor 130 as the display light transmittance 126 viewable by the enemy soldier 104.

The optical shutter sensor 140 may provide a failsafe function to the system for AR visor light security 100 by sensing a status of the optical shutter 134 available to the controller 110 to ensure the optical shutter 134 is in compliance with the controller 110 commanded transmittance. The Sensor LED 142 may provide the controlled transmittance as a known illumination through the optical shutter 134 able to be captured by the sensor receiver 146. Once captured, the controller 110 may determine an actual transmittance capability of the optical shutter 134.

In addition, the sensor receiver 146 may be able to sense an illumination of the ambient component 150 as it passes through the optical shutter 134. Here, the shutter sensor 140 may enable to controller 110 to adjust the transmittance of the ambient component 150 through the optical shutter 134 based on commands from the user via the user input 116 and the sensed ambient transmittance.

The user input 116 may include a plurality of user interface elements specifically configured for the user. For example, a ground-based user may find function using a physical device such as a knob or dial for interacting with the system for AR visor light security 100. Other examples may include a command level directive sent wirelessly from a commander to each user within range. An airborne user may find function with a user input 116 integrated with the platform receiving inputs from each system onboard the aircraft.

The memory 112 may include a tangible, non-transitory memory 112 configured to communicate with the controller 110, the tangible, non-transitory memory 112 may be fitted with instructions stored therein that, in response to execution by the controller 110, cause the controller 110 to carry out each function of the system for AR visor light security 100.

System Function

In one embodiment of the inventive concepts disclosed herein, a function of the system for AR light security 100 may employ the controller 110 to receive a security input from the user input 116 including within which environment the user may be working—a secure environment and a nonsecure environment. As used herein, a secure environment may be defined as an equipment operating mode that reduces the amount of light by actively controlling emissions visible to an outside observer including those environments where the user may desire no light leak as the display light transmittance 126 through the visor 130 causing the user to be visible to another person nearby. Conversely, a nonsecure environment may be defined as an equipment operating mode that does not actively control light emissions visible to outside observer including those situations where the display light transmittance may be tolerable to the user.

In embodiments, the controller 110 may receive the measured controlled transmittance 144 and the measured ambient component transmittance 150 from the optical shutter sensor 140 to determine 1) the optical shutter transmittance to gauge a display light transmittance 126 and 2) how much of the ambient component is reaching the user eye 102. Should the security input represent the nonsecure environment, the controller 110 may command the optical shutter transmittance to the full transmittance of the illumination to offer the user eye 102 a clear view of the ambient component 150 and command the display source 120 to illuminate the see-through waveguide 132 to offer the user eye 102 the holographic AR image.

Should the security input represent the secure environment, the controller 110 may command the optical shutter transmittance to the partial transmittance offering a dimmed view of the ambient component 150. The controller 110 may also command the full occlusion of the illumination occluding each of the ambient component 150 toward the user eye 102 as well as the display illumination 122 based on the measured ambient component transmittance.

For example, in the secure environment, the user may desire a zero transmittance of illumination from inside the visor 130 proximal with the user eye 102. During times of high ambient illumination where the measured ambient component 150 is high, the controller 110 may command the optical shutter 134 to a setting offering a slight occlusion of the ambient component since a threat enemy soldier 104 may be unable to visually sense the illumination escaping the visor 130 as display light transmittance 126.

However, during dark nights where a threat sensing device used by the enemy soldier 104 may offer a high contrast between a dark background and the visor 130, the controller may sense near zero ambient component 150 and in turn substantially occlude the optical shutter 134 to maximum occlusion or near maximum occlusion where the user may be certain that zero illumination from the display source 120 is escaping from the visor 130 to enable detection by the external threat enemy soldier 104.

The controller 110 may receive the measured controlled transmittance 144 from the optical shutter sensor 140, compare the received measured controlled transmittance with the commanded optical shutter transmittance, and if they are equal, command the display source to illuminate the see-through waveguide. However, if the measured optical shutter transmittance 144 does not equal the commanded optical shutter transmittance, the controller may command the display source 120 to off.

To counter glare during operations in which the ambient component 150 is of high illumination, one embodiment of the inventive concepts disclosed herein may include the controller 110 functioning in an auto mode in the nonsecure environment. Here, the controller may receive the measured ambient component transmittance 150 from the sensor receiver 146, receive a desired transmittance from the user via the user input 116, and command the partial transmittance of the illumination based on the measured ambient component transmittance 150 and the desired transmittance.

For example, a pilot flying formation based on a visual reference to a nearby aircraft may look directly into the sun as the formation may maneuver. Specifically, during aerial refueling operations where the receiver aircraft is beneath the tanker aircraft the sun may be a factor to successful aerial refueling. The sensor receiver 146 may sense the greater ambient component 150 allowing the controller 110 to command the optical shutter 134 to occlude a greater amount of the ambient component 150.

In one embodiment of the inventive concepts disclosed herein, the system for AR visor light security 100 may enable the controller 110 to function in a manual mode in either the secure or the nonsecure environment, the manual mode enabling the controller to receive a transmittance input from the user and command the optical shutter transmittance via the transmittance command enabling a user desired level of transmittance (or occlusion). Here, the user may specify the full transmittance, the partial transmittance, and the full occlusion of the illumination based on the transmittance input.

FIG. 2

Figure 2C:
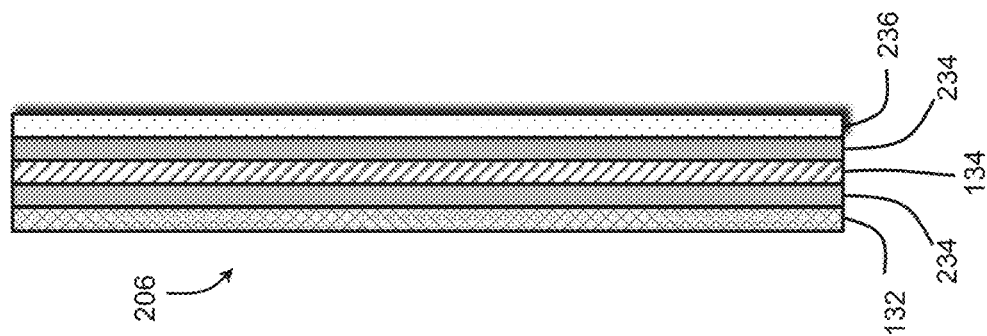
FIGS. 2A-2C are diagrams of a ballistic visor in accordance with an embodiment of the inventive concepts disclosed herein.
Figure 2B:
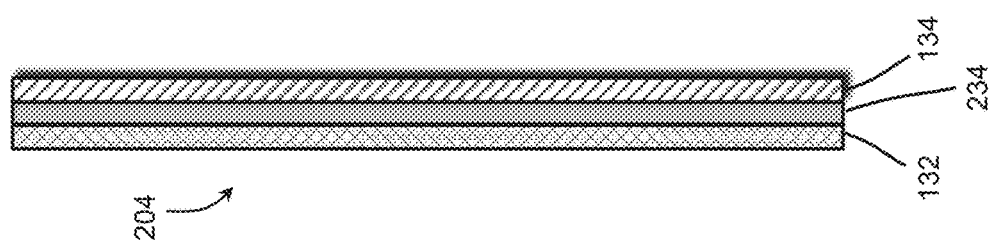
Figure 2A:
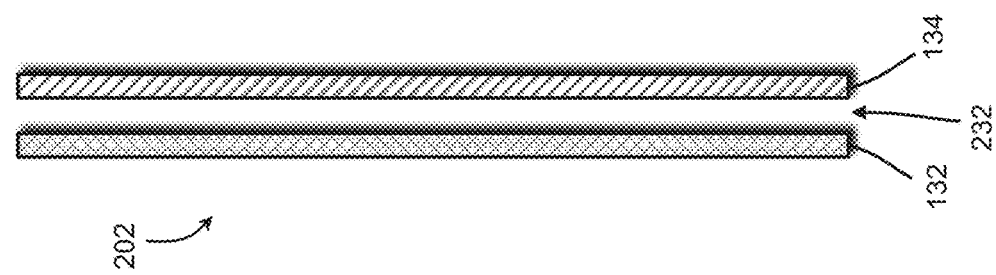

Referring now to FIGS. 2A-2C, diagrams of a ballistic visor in accordance with an embodiment of the inventive concepts disclosed herein is shown. A ballistic visor detail 200 may include an embodiment 202 (FIG. 2A) presenting separate surfaces proximally situated with an air gap 232 between the see-through waveguide 132 and the optical shutter 134. In one embodiment of the inventive concepts disclosed herein, the visor 130 may be enclosed on one or more faces of the see-through waveguide 132 with the optical shutter 134 ballistically protecting the user via the see-through waveguide 132 and optical shutter 134.

An alternate configuration of joined surfaces 204 (FIG. 2B) may include the see-through waveguide 132 coupled with the optical shutter 134 via a clear adhesive 234. In one embodiment of the inventive concepts disclosed herein, the clear adhesive may include a low index pressure sensitive adhesive (e.g., n=1.35) for coupling the surfaces.

FIG. 2C may detail an additional embodiment 206 of the inventive concepts disclosed herein. The visor 130 may be comprised of additional layers of material 236 adding ballistic strength to the visor 130. Contemplated herein, one or more additional layers of a clear or shaded polycarbonate may function within the scope of the inventive concepts disclosed. For example, an expected night ground mission may include a visor 130 including a specific layer of clear material while a daytime flying mission may include a visor 130 of separate ballistic strength to withstand any expected flying related impact (e.g., birds, ejection).

In one embodiment of the inventive concepts disclosed herein, the optical shutter 134 may be constructed of a plurality of types of transparent shutter surfaces. In one embodiment, the optical shutter 134 may be constructed of a liquid crystal (LC) and an electrochromic optical transmittance layer and may further be coated with an anti-reflection and/or an anti-fog coating.

FIG. 3

Figure 3:
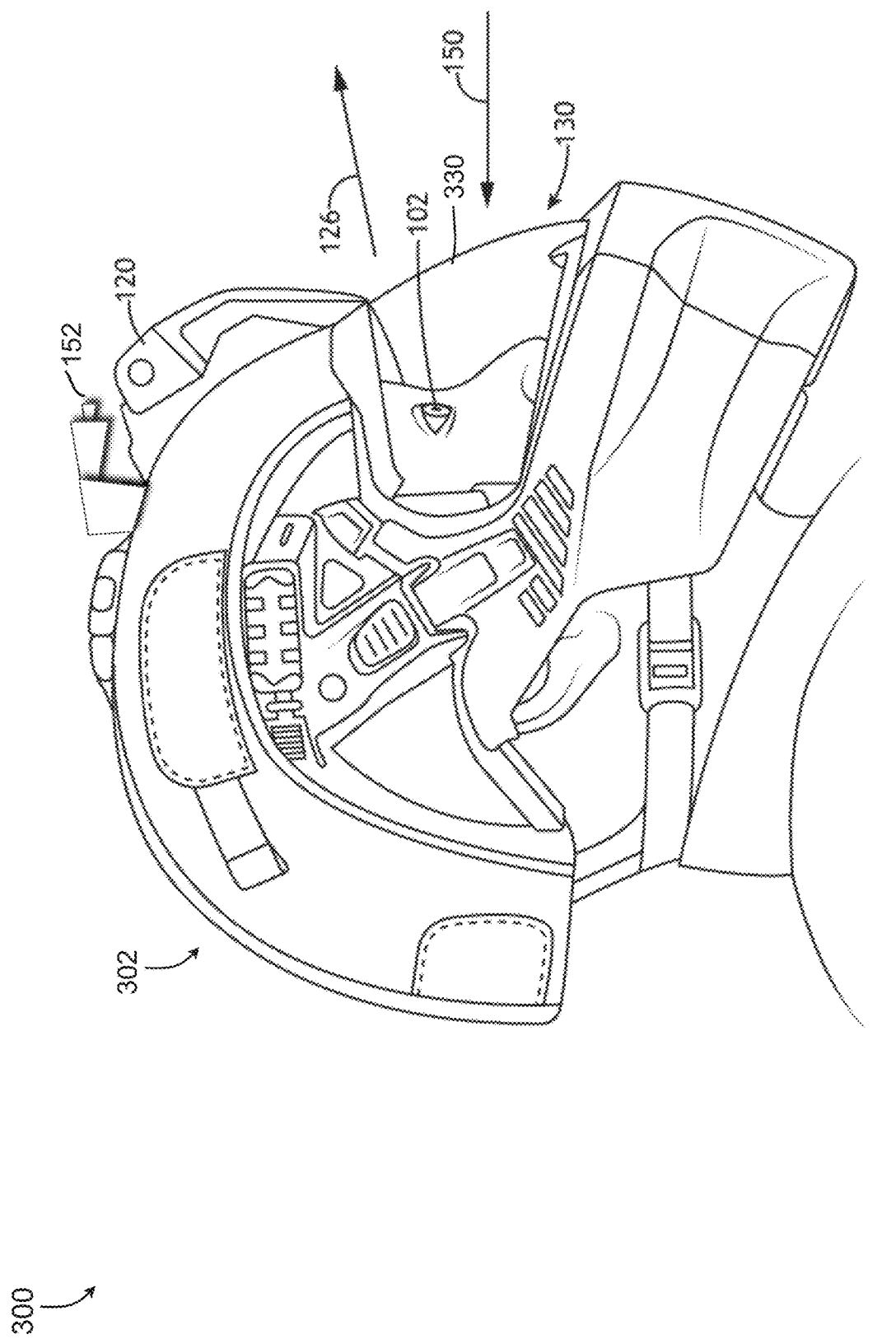
FIG. 3 is a diagram of a helmet side view clear exemplary of an embodiment of the inventive concepts disclosed herein.

Referring now to FIG. 3, a diagram of a helmet side view clear exemplary of an embodiment of the inventive concepts disclosed herein is shown. A user helmet side view clear 300 may include a side view of a helmet 302 with the visor 130 in a nonsecure transmittance 330 state where the controller 110 has commanded a high transmittance of each of the ambient component 150 and the display light transmittance 126.

FIG. 4

Figure 4:
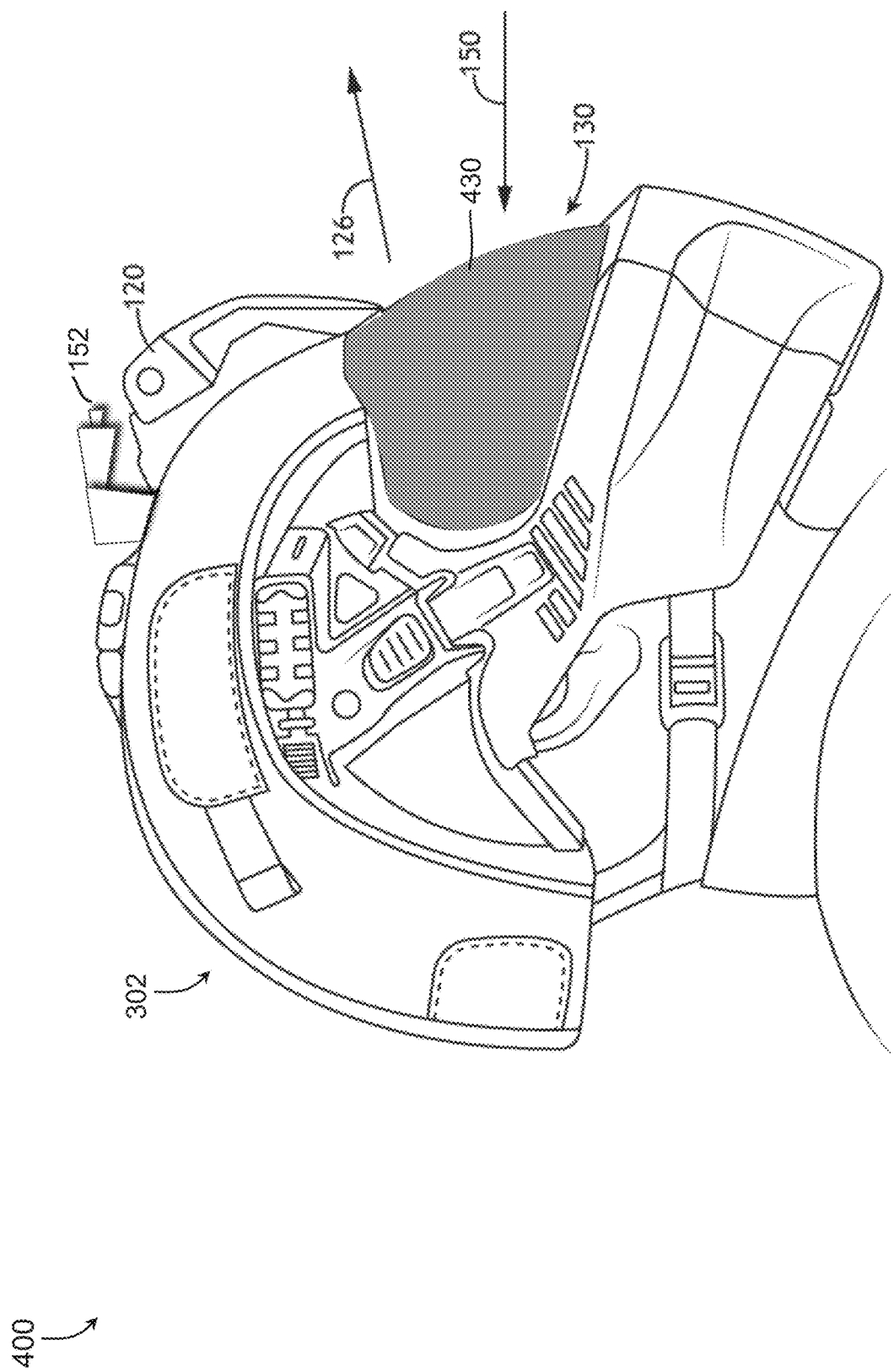
FIG. 4 is a diagram of a helmet side view actively occluded exemplary of one embodiment of the inventive concepts disclosed herein.

Referring now to FIG. 4, a diagram of a helmet side view actively occluded exemplary of one embodiment of the inventive concepts disclosed herein is shown. Conversely, in an occluded active state of the helmet side view active 400, the controller 110 has fully occluded the visor 130 commanding a secure transmittance 430 with zero emissions of the display illumination 122 through the visor 130 and zero transmittance of the ambient component 150 available to the user eye 102.

The enhanced vision digital light sensors 152 associated with the helmet 302 may collect the ambient component 150 at certain levels of ambient illumination. Specifically, during partial moon and starlight conditions the user eye 102 may be less useful to observe the ambient component 150. The controller 110 may present a holographic AR image from the night vision system displayed to the user eye 102 via the display source 120 while commanding a full occlusion of the optical shutter 134 to occlude all bi-directional transmissions of display light transmittance 126 and ambient component 150. Here, the user may rely solely on the internal AR display without need for visualizing the ambient component 150.

FIG. 5

Figure 5:
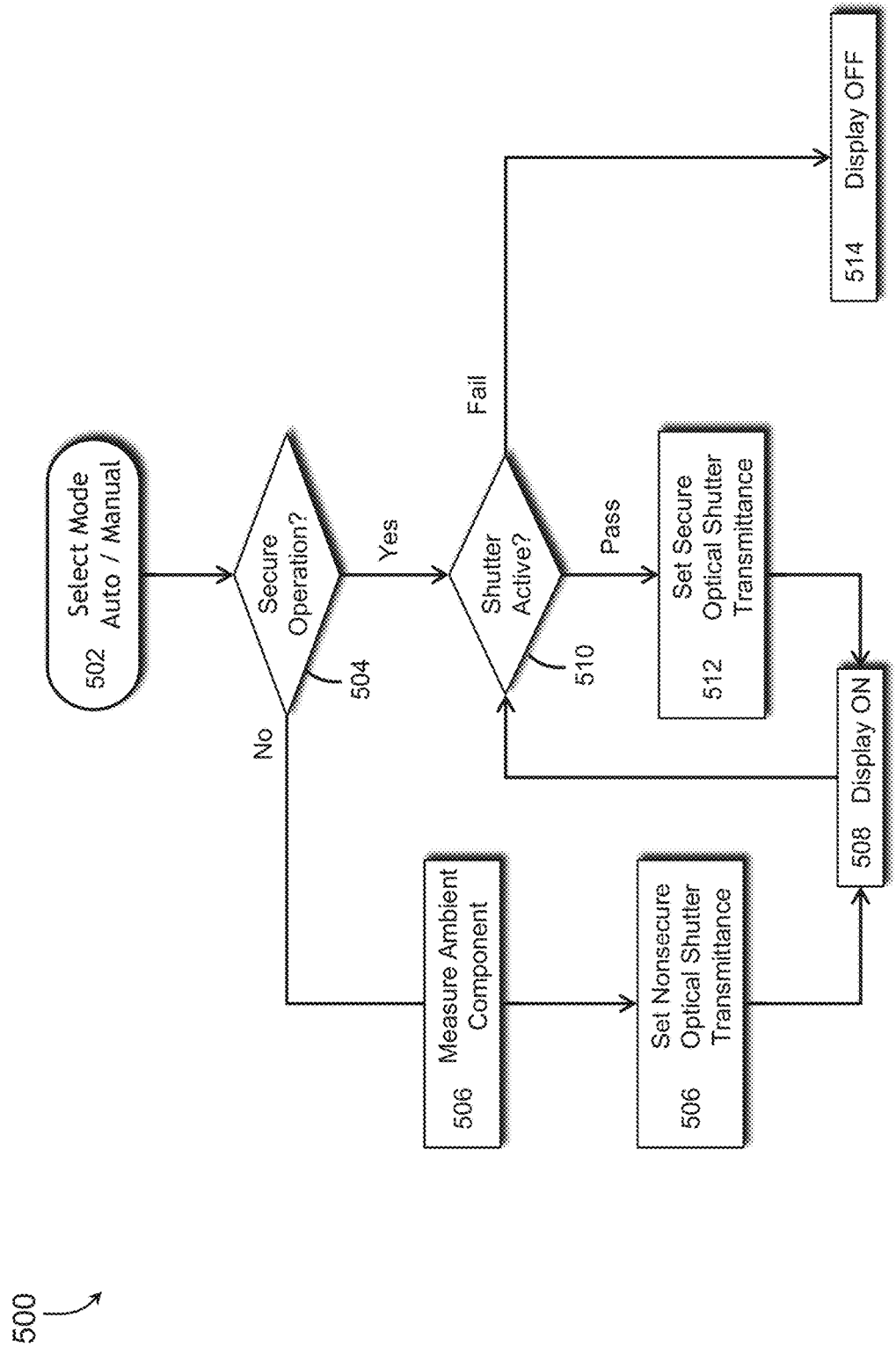
FIG. 5 is a diagram of an exemplary logic flow in accordance with one embodiment of the inventive concepts disclosed herein.

Referring now to FIG. 5, a diagram of an exemplary logic flow in accordance with one embodiment of the inventive concepts disclosed herein is shown. An exemplary logic flow 500 may include a plurality of steps available to the system for AR visor light security 100. A step 502 may include a mode selection to an auto mode or a manual mode by the user and a step 504 may include a query of the environment is secure or nonsecure.

If nonsecure, a step 506 may include the controller 110 setting a nonsecure transmittance of the optical shutter 134 and a step 508 may include commanding the display to the on position to display an AR image to the user.

However, if the environment is one of secure, the controller 110 may, at a step 510, a query if the optical shutter is actively functioning and responding to controller commands. If the optical shutter 134 fails the query and is not responsive, the controller 110 may command the display source 120 to off at a step 514 to ensure the security of the user in the secure environment. However, should the optical shutter 134 respond to the controller commands and may pass the query, the logic may proceed to a step 512 to set secure transmittance of the optical shutter and, at the step 508 to turn the display source on.

In one embodiment of the inventive concepts disclosed herein, the controller 110 may continuously monitor the status of the optical shutter 134 via the optical shutter sensor. Here, the controller may sense a failure of the optical shutter and command the display source to off and the optical shutter to off following the indication of the failure.

FIG. 6

Figure 6:
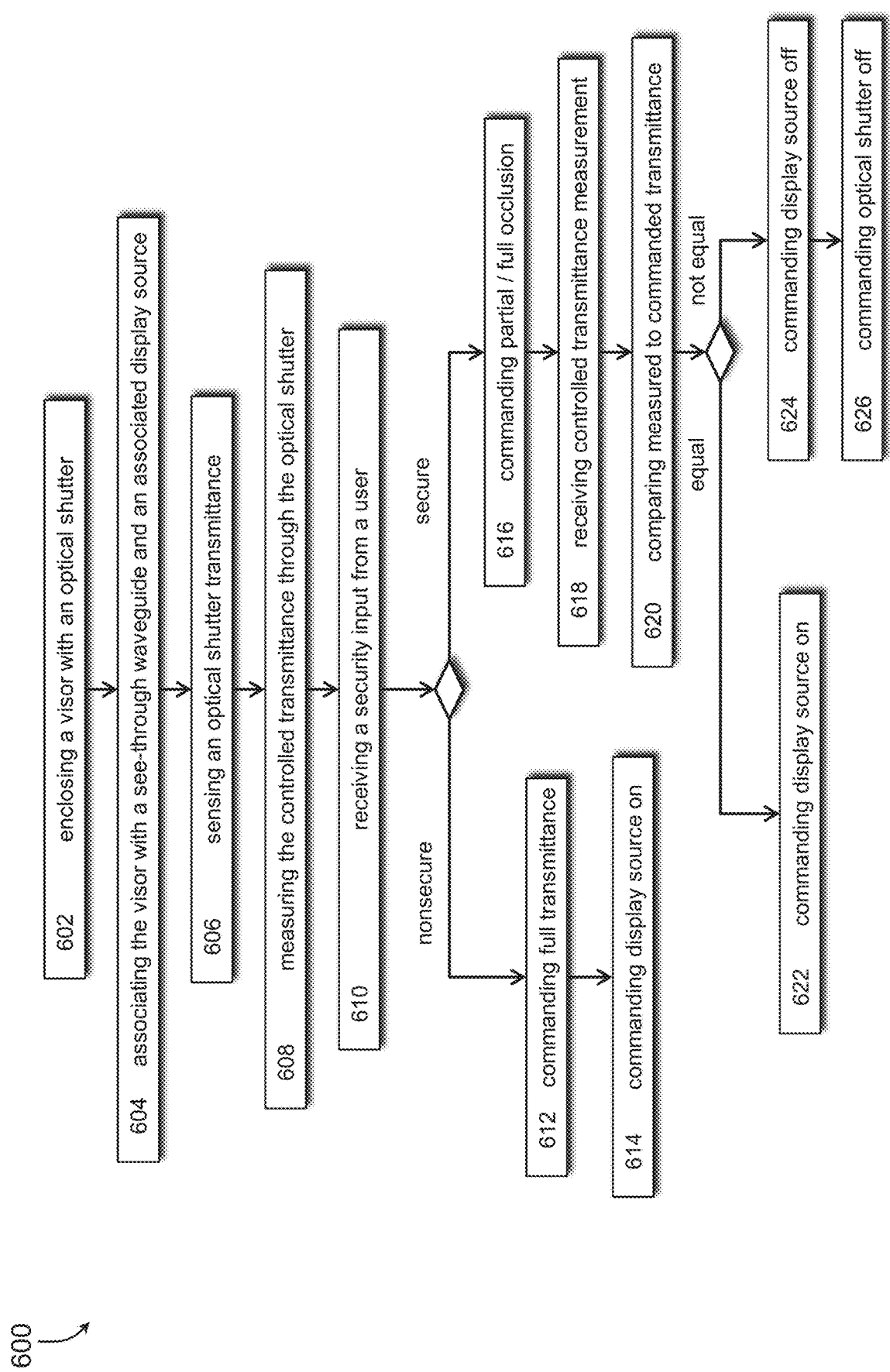
FIG. 6 is a diagram of an exemplary method flow in accordance with one embodiment of the inventive concepts disclosed herein.

Referring now to FIG. 6, a diagram of an exemplary method flow in accordance with one embodiment of the inventive concepts disclosed herein is shown. An exemplary method for AR visor light security 600 may include enclosing, at a step 602, a visor with an optical shutter, the optical shutter configured for a full transmittance, a partial transmittance, and a full occlusion of an illumination through the optical shutter. The method may include associating, at a step 604, the visor with a see-through waveguide and an associated display source and sensing, at a step 606, an optical shutter transmittance via an optical shutter sensor as one of an ambient component transmittance and a controlled transmittance of the illumination through the optical shutter. The method may further include measuring, at a step 608, the controlled transmittance through the optical shutter as one of: the full transmittance, the partial transmittance, and the full occlusion based on the sensing and receiving, at a step 610, a security input from a user including one of: a secure environment and a nonsecure environment.

Should the environment be set by the user as nonsecure, the method may include commanding, at a step 612, the optical shutter transmittance to the full transmittance and commanding, at a step 614, the display source to illuminate the see-through waveguide.

However, should the environment be set by the user as secure, the method may include commanding, at a step 616, the optical shutter transmittance to one of: the partial transmittance and the full occlusion based on the sensed ambient component transmittance and receiving, at a step 618, the measured controlled transmittance from the optical shutter sensor. The method may compare, at a step 620, the measured controlled transmittance with the commanded optical shutter transmittance. If they are equal, the method may command, at a step 622, the display source to illuminate the see-through waveguide. However, if unequal, the method may command, at a step 624, the display source to off and, at a step 626 the optical shutter off.

CONCLUSION

As will be appreciated from the above description, embodiments of the inventive concepts disclosed herein may provide a novel solution to mitigation of light emission from a ballistic AR visor ensuring light security for the user.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for augmented reality visor light security, comprising:
    an optical shutter associated with and enclosing a visor, the optical shutter configured for a full transmittance, a partial transmittance, and a full occlusion of an illumination through the visor, the visor configured for a ballistic protection of a user;
    an optical shutter sensor operatively coupled with the optical shutter and configured for measuring 1) a controlled transmittance and 2) an ambient component transmittance;
    a switching circuit configured for receiving a transmittance command and electrically commanding an optical shutter transmittance, the optical shutter transmittance including at least one of: the full transmittance, the partial transmittance, and the full occlusion;
    a see-through waveguide associated with the visor;
    a display source configured to present an image to the user via the see-through waveguide;
    a controller operatively coupled with the display source, the switching circuit, and the optical shutter sensor;
    a tangible, non-transitory memory configured to communicate with the controller, the tangible, non-transitory memory having instructions stored therein that, in response to execution by the controller, cause the controller to:
    receive a security input from the user including one of: a secure environment and a nonsecure environment;
    receive at least one of: the measured controlled transmittance and the measured ambient component transmittance from the optical shutter sensor;
    if the security input is the nonsecure environment:
       command the optical shutter transmittance to the full transmittance of the illumination; and
       command the display source to illuminate the see-through waveguide;
    if the security input is the secure environment:
       command the optical shutter transmittance to one of: the partial transmittance and the full occlusion of the illumination based on the measured ambient component transmittance;
    receive the measured controlled transmittance from the optical shutter sensor;
    compare the received measured controlled transmittance with the commanded optical shutter transmittance;
    command the display source to illuminate the see-through waveguide if the measured optical shutter transmittance equals the commanded optical shutter transmittance; and
    command the display source off and command the optical shutter off if the measured optical shutter transmittance does not equal the commanded optical shutter transmittance.

2. The system for augmented reality visor light security of claim 1, wherein a source of the illumination includes one of: the display source, a reflection of the display source, and the ambient component.

3. The system for augmented reality visor light security of claim 1, wherein the controller is further configured for an auto mode in the nonsecure environment, the auto mode enabling the controller to:
    receive the measured ambient component transmittance from the optical shutter sensor;
    receive a desired transmittance from the user; and
    command the partial transmittance of the illumination based on the measured ambient component transmittance and the desired transmittance.

4. The system for augmented reality visor light security of claim 1, wherein the controller is further configured for a manual mode in one of the secure or the nonsecure environment, the manual mode enabling the controller to:
    receive a transmittance input from the user; and
    command the optical shutter transmittance via the transmittance command enabling one of: the full transmittance, the partial transmittance and the full occlusion of the illumination based on the transmittance input.

5. The system for augmented reality visor light security of claim 1, wherein the optical shutter further comprises one of: a liquid crystal and an electrochromic optical transmittance layer and is coated with at least one of an anti-reflection and an anti-fog coating.

6. The system for augmented reality visor light security of claim 1, wherein the full transmittance equals a 0% (zero) occlusion, the partial transmittance equals an occlusion range from 1% (one) to 99% (ninety-nine), and the full occlusion equals a 100% (one hundred) occlusion of the illumination.

7. The system for augmented reality visor light security of claim 1, wherein the waveguide and the optical shutter are one of: physically proximal and coupled with an optically clear adhesive to one of: each other and the visor.

8. The system for augmented reality visor light security of claim 1, wherein the see-through waveguide and the optical shutter provide the ballistic protection.

9. The system for augmented reality visor light security of claim 1, wherein the controlled transmittance is measured via a transmittance from a sensor light emitting diode (LED) sited on a first side of the optical shutter measured by the shutter sensor sited on an opposite second side of the optical shutter.

10. A method for augmented reality visor light security, comprising:
    enclosing a visor with an optical shutter, the optical shutter configured for a full transmittance, a partial transmittance, and a full occlusion of an illumination through the optical shutter;

associating the visor with a see-through waveguide and an associated display source;

sensing an optical shutter transmittance via an optical shutter sensor as one of an ambient component transmittance and a controlled transmittance of the illumination through the optical shutter;

measuring the controlled transmittance through the optical shutter as one of: the full transmittance, the partial transmittance, and the full occlusion based on the sensing;

receiving a security input from a user including one of: a secure environment and a nonsecure environment;

if the security input is the nonsecure environment:
  commanding the optical shutter transmittance to the full transmittance; and
  commanding the display source to illuminate the see-through waveguide;

if the security input is the secure environment:
  commanding the optical shutter transmittance to one of: the partial transmittance and the full occlusion based on the sensed ambient component transmittance;
  receiving the measured controlled transmittance from the optical shutter sensor;
  comparing the measured controlled transmittance with the commanded optical shutter transmittance;
  commanding the display source to illuminate the see-through waveguide if the measured optical shutter transmittance equals the commanded optical shutter transmittance; and
  commanding the display source to off if the measured optical shutter transmittance does not equal the commanded optical shutter transmittance.

11. The method for augmented reality visor light security of claim 10, further including an auto mode in the nonsecure environment, the auto mode including:
  receiving the sensed ambient component transmittance from the optical shutter sensor;
  receiving a desired transmittance from the user; and
  commanding the partial transmittance of the illumination based on the measured ambient component transmittance and the desired transmittance.

12. The method for augmented reality visor light security of claim 10, further including a manual mode in one of the secure or the nonsecure environment, the manual mode including:
  receiving a transmittance input from the user;
  commanding the optical shutter transmittance enabling one of: the full transmittance, the partial transmittance and the full occlusion of the illumination.

13. The method for augmented reality visor light security of claim 10, further including commanding the full transmittance equaling a 0% (zero) occlusion, the partial transmittance equaling an occlusion range from 1% (one) to 99% (ninety-nine), and the full occlusion equaling a 100% (one hundred) occlusion of the illumination.

14. The method for augmented reality visor light security of claim 10, further including sensing a failure of the optical shutter and commanding the display source to off and the optical shutter to off following the failure.

15. The method for augmented reality visor light security of claim 10, wherein enclosing the visor with the optical shutter further comprises ballistically protecting the user via the see-through waveguide and optical shutter.

* * * * *